United States Patent [19]

Ritter et al.

[11] Patent Number: 5,512,617

[45] Date of Patent: Apr. 30, 1996

[54] THERMOPLASTICALLY PROCESSABLE STARCH-BASED MATERIALS, SHAPED ARTICLES MANUFACTURED THEREFROM AND PROCESS FOR PRODUCING SAID MATERIALS

[75] Inventors: Wolfgang Ritter, Haan; Michael Beck, Duesseldorf, both of Germany

[73] Assignee: Henkel Kommanditgesellschaft auf Aktien, Duesseldorf, Germany

[21] Appl. No.: 307,597

[22] PCT Filed: Mar. 19, 1993

[86] PCT No.: PCT/EP93/00673

§ 371 Date: Sep. 16, 1994

§ 102(e) Date: Sep. 16, 1994

[87] PCT Pub. No.: WO93/19124

PCT Pub. Date: Sep. 30, 1993

[30] Foreign Application Priority Data

Mar. 20, 1992 [DE] Germany ............... 42 09 095.4

[51] Int. Cl.[6] ............... C08L 3/00; B29B 7/00; B29C 47/36; B28B 3/20
[52] U.S. Cl. ........... 524/47; 264/176.1; 264/211.24; 264/211.13; 264/211.15; 264/211; 264/349
[58] Field of Search ............... 264/349, 176.1, 264/211.24, 211, 211.13, 211.15; 524/47

[56] References Cited

U.S. PATENT DOCUMENTS

| 4,600,400 | 7/1986 | Guevarra et al. ............ 106/211 |
| 5,095,054 | 3/1992 | Lay et al. ............ 524/47 |

FOREIGN PATENT DOCUMENTS

| 0327505 | 8/1989 | European Pat. Off. . |
| 0400531 | 5/1990 | European Pat. Off. . |
| 0400532 | 5/1990 | European Pat. Off. . |
| 2544401 | 4/1976 | Germany . |
| 4038732 | 6/1992 | Germany . |
| 4121111 | 1/1993 | Germany . |
| WO9001043 | 2/1990 | WIPO . |
| WO9005161 | 5/1990 | WIPO . |
| WO9010671 | 9/1990 | WIPO . |

OTHER PUBLICATIONS

Stepto, R., "Injection Moulding of Natural Hydrophilic Polymers in the Presence of Water", *Tecnologie*, Chima 41, Mar. 1987.

Szejti, V., "Bestimmung der Dissoziationskonstanten für Amylose–Einschlussverbindungen" Starch/Stärke 30, Verlag Chemmie, 1978, pp. 85–91.

Krüger, E., "Stäkeeinschlussverbindungen und ihre Bedeutung beim Maischen", Monatsschrift für Brauwissenschaft, Dec. 1984 pp. 505–512.

Davies, T., "Inclusion Complexes of Free Fatty Acids with Amylose". Starch/ Stärke 32, Verlag Chemie 1980, pp. 149–158.

*Primary Examiner*—Peter A. Szekely
*Attorney, Agent, or Firm*—Wayne C. Jaeschke; J. Daniel Wood; Daniel S. Ortiz

[57] ABSTRACT

Described are materials based on a starch which has been thermomechanically digested at elevated temperatures and pressures and upon the addition of water and/or lower molecular weight plasticizers and which contains oxidatively cross-linkable alkyd resins having been incorporated in an intimate admixture. Preferably, these alkyd resins have been at least predominantly composed of key substances based on re-growable raw materials.

The starch blends thus modified are suitable for the manufacture of shaped articles which in the presence of air will be reactively cured and thereupon are imparted with an increased strength, and especially an increased resistance to water.

44 Claims, No Drawings

THERMOPLASTICALLY PROCESSABLE STARCH-BASED MATERIALS, SHAPED ARTICLES MANUFACTURED THEREFROM AND PROCESS FOR PRODUCING SAID MATERIALS

BACKGROUND OF THE INVENTION

1. Field of the Invention

The invention relates to improvements in the production of materials based on modified starch present in an intimate admixture with selected thermoplastic polymer compounds and to molded articles manufactured from said materials.

2. Discussion of Related Art

Numerous recent proposals deal with the attempt of opening up an extended range of possible fields of application to high molecular weight polymer compounds of natural origin—and especially to starch, among these. All of this work has been based on the recognition that native starch, together with limited amounts of water and/or further auxiliary materials, by means of a thermomechanical digestion can be converted into a thermoplastic material that can be processed in a conventional manner, for example by injection molding. The thermomechanical digestion by employing elevated temperatures and pressures is possible, more specifically, in conventional extruders provided upstream of the shaping step. From the comprehensive literature, here particular reference may be made to the publication by R. F. T. Stepto et al., Injection Moulding of Natural Hydrophilic Polymers in the Presence of Water, Chimia 41 (1987), No. 3, 76–81, and the literature quoted therein.

Extensive work deals with the improvement of the product properties in the thermoplasticized starch by the concomitant use of selected organic auxiliary liquids in the starch digestion. Here, as an example, the PCT patent application No. WO 90/05 161 may be mentioned. Herein it is proposed to add loading materials to the native starch, which loading materials decrease the melting temperature of the starch and are additionally characterized by a definite solubility parameter. As the loading materials there have been especially mentioned lower polyfunctional alcohols such as ethyleneglycol, propyleneglycol, glycerol, 1,3-butanediol, diglyceride, appropriate ethers and further compounds.

Materials based on starch which has been thermoplasticized in that manner are distinguished by a very much restricted utility. The reason is the extremely marked hydrophilicity of the material. Accordingly, the replacement nowadays desired in wide areas of polymer compounds of synthetic origin by a biologically degradable polymer material of natural origin is possible only to a very limited extent or is not even possible at all.

More recent proposals relate to the attempt of combining thermoplasticized starch with synthetically produced water-resistant polymer compounds in such a manner that the hydrophilic starch-based polymer compound exhibits an increased stability against hydrophilic solvents, while neverthelesss substantial proportions of the materials or molded article, respectively, are comprised of the starch. From the pertinent literature, the PCT patent application No. WO 90/01 043 may be mentioned. Described therein is coating hydrophilic polymers, such as starch, with selected aliphatic polyesters which in turn are degradable, especially by bacteria or fungi. In particular there is described coating molded articles made of starch with polyesters derived from lower hydroxycarboxylic acids, such as glycolic acid, lactic acid, hydroxybutyric acids and hydroxyvaleric acid. Since such layers when combined do poorly adhere to each other, an improvement of the adhesion is proposed by some preceding treatment of the starch surface and/or by the addition of a solvent or swelling agent for the starch to the coating solution.

Another approach—towards the same goal—is described by EP-A2-327 505. Herein, polymer mixed materials have been described which are recovered from a melt of water-containing destructured starch and at least one water-insoluble synthetic thermoplastic polymer compound. The procedure in detail is as follows: First, a thermoplasticized starch is produced—and worked up to form granules—from starch in an untreated or pretreated form with the addition of auxiliary materials such as hydrogenated fatty acid triglycerides, lecithin and especially water by a treatment in an extruder at elevated temperatures—of, for example, 175° C.—and the associated intrinsic elevated pressures. The water content in the granule is adjusted to the water content of natural starch (about 17% by weight). This granular starch is then mixed in the dry state with synthetic polymer compounds in pre-determined mixing ratios. Examples of such thermoplastic water-insoluble polymers of synthetic origin are polyethylene, polystyrene, polyacetals, ethylene/acrylic acid copolymers and ethylene/vinyl acetate copolymers. The respective polymer mixtures are then processed in a conventional manner on an injection molding machine at material temperatures of 165° C. to form molded articles.

Further proposals in the area concerned here of thermoplastically processable starch-based polymers are found in EP-A1- 0 400 531 and EP-A1-0 400 532 and in the PCT patent application No. WO 90/10 671. The last-mentioned printed publication, more particularly, contains extensive information on the procedures of mixing and thermoplastically digesting the polymer compounds employed in the presence of water in suitable extruders and on the procedure of at least partially stripping the water from the mixed materials, expediently in the process step carried out in the extruder.

The subject matter of the older German patent application P 40 38 732.1 comprises materials and/or molded articles based on thermomechanically digested starch in admixture with synthetic thermoplastic polymer compounds. These polymer-modified materials are produced by mixing native starch with aqueous polymer dispersions of the synthetic thermoplastic polymer compounds and, if desired, further lower molecular Weight plasticizers, subjecting the multimaterial mixture to a starch digestion at elevated temperatures and pressures with simultaneous intensive mixing and/or kneading to form a thermoplastically processable starch, and optionally shaping the homogenated polymer mixture. The amount of water introduced via the aqueous dispersion of the synthetic polymer compound is an integral constituent of the process which is utilized and becomes effective in the digestion process of digesting the starch. Suitable, at least largely water-insoluble thermoplastic synthetic polymer compounds, according to this older proposal by Applicants, are, for example, emulsion (co)polymers such as polyvinyl ester, poly(meth) acrylates and/or corresponding copolymers. Polyesters, polyamides and/or polyurethane resins have further been mentioned, among which those thermoplastic polymer compounds may be preferred which contain polar groups or molecule moieties and optionally connect to molecule moieties having a marked oleophilic character.

It is the subject matter of a further older German patent application by Applicants according to P 41 21 111 to modify materials and/or molded articles based on an accordingly thermomechanically digested starch in such a manner that there are present, in admixture with the thermoplasticized starch, suitable polyesters and/or polyamides as synthetic thermoplastic polymer compounds which have been at least partially composed of key substances based on re-growable raw materials.

The further development now presented as described hereinbelow resumes Applicants' proposals set forth in the two above-mentioned older German patent applications according to P 40 38 732 and U.S. application Ser. No. 08/070,409, now U.S. Pat. No. 5,439,953 and modifies the teaching thereof in the way described hereinbelow. For the sake of completeness of the disclosure of the invention, the contents of the disclosures of U.S. application Ser. No. 08/070,409, now U.S. Pat. No. 5,439,953 is explicitly incorporated by reference in the present invention.

The teaching of the present invention comprises the following concept: The thermomechanically digested starch is to be present in admixture with selected thermoplastically processable polymer compounds, which exhibit oxidative reactivity due to selected functional groups. The production of the polymer mixture from thermoplasticized starch and the incorporated synthetic polymer compound is effected in the manner described in Applicants older application, that is with the exclusion of oxygen and/or air, respectively, to such a degree that an oxidative reaction of the incorporated oxygen-reactive polymer component does not or not substantially take place. Obtained is a thermoplastically processable starch-based polymer mixture which may either be directly shaped in a per se known manner or is storable for a virtually unlimited time under the exclusion of oxygen—or air—access. The molded body made from this polymer mixture and brought into the desired three-dimensional shape is then, more particularly, exposed to the action of air. The oxidatively reactive groups of the incorporated polymer component are, thus, activated and lead to cross-linking or at least partial cross-linking of the synthetic polymer material having been homogeneously admixed with the thermoplasticized starch. The most important result of this reaction consists of that the resistance to water of the starch-based polymer material is positively influenced. Thereby the utility of the corresponding polymer mixtures is substantially enhanced. Further details will be found hereinbelow.

SUMMARY OF THE INVENTION

Accordingly, the present invention, in a first embodiment, relates to thermoplastically deformable materials based on a starch which has been thermomechanically digested at elevated temperatures and pressures and upon the addition of water and/or lower molecular weight plasticizers and which contains thermoplastic synthetic compounds having been incorporated in an at least largely homogeneous admixture. The characteristic of the invention in the new embodiment resides in that these materials contain—as synthetic polymer compounds—oxydatively reactive cross-linking or oxidatively reactive alkyd resins. The oxidatively reactive alkyd resins, more particularly, have been formulated as air-drying compositions and, in a preferred embodiment, have been predominantly composed of key substances based on re-growable raw materials.

In a further embodiment, the invention relates to the shaped articles based on the above described materials or material mixtures and having an increased strength and especially an increased resistance to water, said materials or material mixtures being characterized in that they have been produced by shaping said polymer mixtures based on the thermoplasticized starch and the oxidatively reactive alkyd resins and, due to the access of oxygen, and more specifically of air, contain the alkyd resin component in an oxidatively reacted form.

The invention eventually relates to the process of producing the oxidatively reactive thermoplastic material mixtures and to the use of said mixtures of valuable materials for making shaped articles having improved performance, especially having an increased resistance to water and/or moisture.

DETAILED DESCRIPTION OF THE INVENTION

The nub of the teaching according to the invention is the selection of the thermoplastically processable synthetic mixture components based on oxidatively reactive or cross-linkable alkyd resins and the incorporation thereof in the starch base key material. The invention intends not only to realize the concept having not been described hitherto, according to Applicants knowledge, namely reactively to consolidate shaped articles made of starch-based materials with concomitant use of oxidatively reactive mixture components. Improvements in the area here concerned are further intended to be brought about in a variety of ways by means of a plurality of additional features which are preferred and will be described hereinbelow.

What is first essential is the definition of the oxidatively reactive alkyd resins. The term "alkyd resins", especially thermoplastic alkyd resins is known to refer to polyesters from polycarboxylic acids, polyols and monofunctional alcohols and/or carboxylic acids. Oxidatively reactive acids basically are known commercial products; hereto, reference may be made to the general technical knowledge in the art. They may be used, for example, as self-drying varnish. Known commercial products, more particularly, have been provided in the form of aqueous dispersions containing the self-drying alkyd resins as dispersed fine resin particles in a continuous aqueous liquid phase. Air-reactive aqueous alkyd resin dispersions of this kind are especially suitable feed materials for the purposes of the invention.

The oxidative reactivity of such alkyd resin derivatives is usually derived from a content of olefinically unsaturated substituents on the alkyd resin polyester molecule. Such olefinically unsaturated reactive constituents may be introduced into the alkyd resin molecule in a per se known manner by incorporating unsaturated alcohols and/or by incorporating unsaturated carboxylic acids. Also here—and especially so in the context of the teaching according to the invention—of particular interest may be those representatives of the alkyd resin types mentioned which at least partially have been composed of key components based on natural products. Thus, monocarboxylic acids and/or monofunctional alcohols of natural origin may be used for the derivatization of the alkyd resins. Upon the use of dicarboxylic acids and at least trifunctional alcohols in combination with monofunctional carboxylic acids and optionally further diols, for example, corresponding monocarboxylic acid-derivatized alkyd resins will become accessible which may be rendered oxidatively reactive or oxidatively cross-linkable, respectively, by employing monocarboxylic acids, at least part of which is olefinically mono- and/or polyunsaturated. In a per se known manner, using the functionalities reversed, an oxidatively reactive alkyd resin may be produced that has been modified with olefinically unsaturated alcohols.

Alkyd resins based on natural products of the particularly preferred kind according to the invention are derived from glycerol as the trifunctional polyol component and fatty acids of natural origin as the monofunctional carboxylic acid component. The monofunctional reactants are employed in such amounts, on the average, that the desired reaction with dicarboxylic acids—for example phthalic acid or phthalic anhydride, respectively—will be possible. Modified alkyd resins of this kind which have at least predominantly been based on natural products are distinguished in that more than 50% by weight, and preferably between 60 and 70% by weight, of the alkyd resin, have been formed from these components based on natural products, especially glycerol and monofunctional fatty acids, whereas the balance is comprised of dicarboxylic acids and optionally additional diol components in the polymer molecule.

For the purposes of the invention, particular importance may be attached to the selection of the monofunctional constituents of the alkyd resin, and especially the corresponding fatty acids. First of all, by the concomitant use of olefinically mono- and/or polyunsaturated carboxylic acids, a sufficient reactivity of the alkyd resin upon the access of oxygen or air, respectively, will have to be ensured. In a preferred embodiment, the teaching of the invention just intends to provide the following continuing improvement through these monofunctional carboxylic acid moieties: It has been known that starch is capable of including straight-chain hydrocarbon moieties of a higher number of carbon atoms—for example the hydrocarbon moieties of straight-chain fatty acids having from 12 to 20 carbon atoms—in the form of inclusion compounds. In the course thereof, the straight-chain hydrocarbon moiety is intercalated in the interior space of the starch present in a helical structure. There are formed the so-called cage inclusion compounds, also called "clathrates". As to the pertinent literature, reference may be made to J. Szejtli et al., "Bestimmung der Dissoziationskonstanten für Amylose-Einschlußverbindungen", STARCH/Stärke 30 (1978) 85–91, T. Davies et al., "Inclusion Complexes of Free Fatty Acids with Amylose", STARCH/Stärke 32 (1980) 149–158, as well as E. Krüger et al., "Stärkeeinschlußverbindungen und ihre Bedeutung beim Maischen", Monatszeitschrift für Brauwissenschaft, Issue 12/1984, 505–511.

The teaching of the invention, in a preferred embodiment, utilizes this knowledge as follows: The oxidatively cross-linking resins are modified with straight-chain saturated hydrocarbon moieties having a sufficient length, especially with corresponding straight-chain fatty acid moieties having, for example, from 12 to 20 carbon atoms, in addition to the olefinically unsaturated substituents. These straight-chain saturated substituents on the alkyd resin molecule then are capable of forming an inclusion compound with the helix formation of the starch. The thermomechanical digestion process still to be described in detail hereinbelow which, according to the invention, is carried out in the presence of the substituted alkyd resin compound provides conditions resulting in an interaction between the starch helix and the alkyd resin substituted with the straight-chain saturated hydrocarbon moieties. Thereby, an additional bonding is effected between the two polymer types in the final product which is characterized by an increased strength realized in the finally desired shaped article.

Particularly suitable for a use in the present invention are those oxidatively reactive alkyd resin types of the described type which contain, on the one hand, olefinically unsaturated, and preferably sufficiently long-chain, substituents and, on the other hand, also straight-chain sufficiently long-chain hydrocarbon moieties as substituents. Especially suitable are, accordingly, alkyd resins of the described type which have been substituted with mixtures of olefinically unsaturated and saturated straight-chain monocarboxylic acids. It has been shown that mixing ratios of about from 20 to 60% by mole, and especially of about from 30 to 50% by mole, of the unsaturated carboxylic acid moieties in admixture with the straight-chain fatty acid moieties are particularly suitable, % by mole here relative to the mixture of saturated and unsaturated substituents, i.e. especially of the corresponding monocarboxylic acid moieties.

Alkyd resins of the type described, for example, may have average molecular weights within the range of about from 3,000 to 20,000, and preferably of about from 3,000 to 10,000.

If, in the embodiment as preferred according to the invention, the alkyd resins are employed in the form of their aqueous dispersions, then, again in a preferred embodiment, it may be desirable to employ self-emulsifying alkyd resin types of the described type. Meanwhile, in this context, those alkyd resin types are particularly suitable which are free from solubilizing salt groups and the emulsifying power of which is especially due to incorporated free hydroxyl groups and/or ether groups while, however, the invention is not restricted to such self-emulsifying alkyd resin types.

The alkyd resins which are oxidatively reactive or cross-linking, respectively, and have been presented here and, within the scope of the teaching according to the invention, have now been used for the first time in combination with starch are incorporated in the starch preferably in the manner as described in the older application P 40 38 732 and thereby are fully included in the thermomechanical starch digestion. In order to complete the description of the invention, the relevant indications set forth in said older application may be briefly reviewed.

The selected starch feedstock is intimately mixed with the aqueous alkyd resin dispersion. Further auxiliary agents as far as required, especially the lower molecular weight plasticizers and/or additional water, are added, whereupon the multi-material mixture is subjected to the starch digestion at elevated temperatures and pressures with simultaneous mixing and/or kneading to form the thermoplastically processable starch. The aqueous phase of the incorporated alkyd resin dispersion in this form becomes an active reactant in the starch digestion, which reactant is essential to the invention.

The proportion of the oxidatively reactive alkyd resin in the solids mixture—relative to the solids mixture comprising starch and alkyd resin free from water and/or lower molecular weight plasticizers—may comparably be very low and nevertheless already may become substantially effective such as to provide some product optimization in the final product. Thus, already from 0.5 to 1% by weight of alkyd resin, and especially at least about from 1 to 2% by weight of alkyd resin in the solids mixture comprising starch/alkyd resin will be effective mixing components within the scope of the teaching according to the invention. However, higher amounts of the alkyd resins may also be chosen so that the alkyd resin, for example, may comprise up to about 50% by weight of the solid phase, % by weight here and in the following again relative to the mixture of the solids comprising starch and alkyd resin free from water and/or lower molecular weight plasticizers. Particularly suitable ranges for the amount of the alkyd resin additive are up to about 30% by weight, and preferably up to about from 10 to 15% by weight.

In a per se known manner the mixtures of the solids for the thermomechanical procedure contain water and/or lower molecular weight plasticizers in amounts of at least about 10% by weight, and preferably in amounts of at least about 15% by weight and especially in amounts within the range of about from 25 to 55% by weight. Therein, the mixing ratios of the components may be within the following numerical ranges indicating, as guideline figures, the % by weight amounts relative to the material employed altogether in the thermoplastication:

| | |
|---|---|
| Starch | 20 to 50% by weight; |
| Alkyd resin | 1 to 35% by weight; |
| Water | 5 to 30% by weight; |
| Lower molecular weight plasticizer, especially glycerol | 10 to 50% by weight. |

As the lower molecular weight plasticizer, there may be used all components described for this purpose in prior art; particularly suitable compounds are lower polyfunctional alcohols and/or the ethers thereof, among which glycerol as already mentioned is an especially suitable representative. Glycerol is often used in amounts of about from 15 to 30% by weight, relative to the total mixture.

The starch to be employed in the process may be of any origin. Starch sources such as potatoes, corn, rice, the usual cereals and the like may be mentioned in the first place here. The starch is generally employed in powder form. If so desired, it may be subjected to pre-treatments such as a partial drying, an acid washing and/or further pre-treatments, especially in order to physically modifying the starch. The water content of the starch feedstock, being especially of natural origin, may vary within a wide range and, for example, comprise about from 5 to 40% —relative to the starch feedstock. Usually, the water content of the starch feedstock will be at least 10% by weight and often is within the range of from 10 to 25% by weight—again relative to the starch feedstock.

The operations of mixing and starch digestion is carried out in devices such as those per se known for the thermoplastic digestion of starch with water and/or lower organic auxiliary components of the described kind. Accordingly, the step of starch digestion is carried out in closed kneaders or, preferably, in extruders. Therein, the residence time and the processing conditions are mutually adjusted so that the thermomechanical starch digestion as well as the desired formation of a homogeneous mixture of all of the components are ensured.

The individual components of the mixture may be supplied continuously to the respective employed working device, for example to the extruder, in the feed region thereof in the amount required. In the course of the transportation of the multi-component mixture through the extruder, the desired process of homogenation and mixing takes place especially in the front (upstream) compartments. The following adjacent processing path is maintained under product temperatures and pressures producing the desired thermomechanical starch digestion. Herein, the product temperatures are above 100° C., and preferably at or above 120° C., while working conditions ranging to about 170° C. may be preferred at least in the final phases of the process of mixing and starch digestion. The employed working pressure usually conforms to the intrinsic pressure of the water-containing material mixture at the pre-determined working temperature. The residence times of the multi-material mixture under the working conditions in general are not more than a maximum of about 30 minutes, and preferably than a maximum of about 20 minutes. It may be appropriate to employ residence times of the multi-material mixture at least within the range of the temperature and pressure conditions for starch digestion of about from 0.5 to 10 minutes, and preferably within a range of about from 2 to 5 minutes.

The homogenated polymer blend may be recovered as extrudate. However, here the oxidative reactivity of the substance mixture is to be taken into consideration. Investigations by Applicants revealed that a freshly prepared extrudate can be subjected to a further step of shaping trouble-free under normal working conditions, i.e. especially in the presence of air, if this process step will without delay be carried out subsequently to the production of the polymer blend. Nevertheless, it is likewise possible to intermediately store the reactive extrudate for a virtually unlimited period of time; however, to this end it will be necessary to exclude any access of the oxygen of the air to the material as primarily obtained, i.e. to the granules into which the extrudate usually will have been converted. Accordingly, here the invention provides recovering and storing the reactive compositions in an inert gas atmosphere. Usable inert gases include, more specifically, nitrogen and carbon dioxide. It may be desirable to protect already the feed region of the mixing extruder with an inert gas from an access of air and oxygen.

If so desired, at least a portion of the water added for the mixing and digestion procedure may be removed from the polymer blend prior shaping same. This is possible by evaporating an appropriate amount of water in the course of the mixing and digesting procedure, after the desired reactions will have sufficiently been completed.

The nub of the teaching according to the invention is constituted by the described substance mixtures obtained from the thermomechanically digested starch, on the one hand, and the oxidatively reactive alkyd resins, on the other hand. In addition thereto, in one embodiment the invention provides to concomitantly use further thermoplastic polymer compounds within the scope of the teaching of Applicants' cited older patent applications. The idea of the materials mixtures having at least largely predominantly been based on natural products is then best realized, when respective mixing components based on natural products such as those described, for example, in the older application P 41 21 111 are incorporated as additive polymers. If such third components are concomitantly used within the scope of the teaching according to the invention, then it may be expedient to restrict the amounts thereof to about 50% by weight at most, and preferably to amounts of about 30% by weight at most—relative to the neat solid mixture.

EXAMPLES

The following general notes refer to the devices and raw materials employed in the following examples.

a) Devices

The following process steps are required for the production of the TPS (thermoplastic starch) blends:

Conveying the components available in the forms of a liquid, a dispersion, granules or a powder into an extruder;

Densifying the extrusion mass to form a compact solid;

Causing the extrusion mass to melt;

Homogenating the resulting melt;

Pumping the melt through an extrusion die (nozzle).

Basically suitable for this purpose are screw-type extruders in a variety of embodiments such as, for example, single-screw extruders or twin-screw extruders rotating in the same direction or in opposite directions. In view of advantages known from the literature (cf., inter alia, Handbuch der Kunststoffextrusionstechnik, Vol. 1, Hanser-Verlag, 1989), such as Self-cleaning of the screws, narrow spectrum of residence times, uniform stress on the product, a twin-screw extruder with its screws rotating in the same direction and having the following specifications was used in the examples described hereinbelow:

| Type Continua C37, manufactured by Werner & Pfleiderer | |
|---|---|
| Driving power: | 7.6 kW |
| Length of the screws: | 960 mm |
| L/D ratio: | 24. |

By means of a modular systems of screws and housings, advancing, plasticizing, homogenizing, pressurizing and venting zones were realized in compliance with the objects to be attained. In addition, the screw housing was subdivided into two heating zones which were equal in length and independently controllable. The feed of the components present in liquid and solid states was effected by means of gravimetrically controlled metering units (company Schenck). In general, the following extrusion parameters were used:

| Temperature: | 100° C. to 150° C. |
|---|---|
| Rate of rotation: | 100 rpm |
| Total throughput: | 6–18 kg/h. | b) Raw Materials

For the production of the TPS blends based on starch/alkyd resin polyester, the following raw materials were employed:

Potato starch (from, e.g., Südstärke GmbH or Emsland-Stärke) having a water content of from 17 to 20%, or wheat starch having a water content of from 10 to 15%.

Air-drying alkyd resin polyester in the form of aqueous dispersions, commercial products of the company J äger, having the product designations "JÄGALYD" WE 57, WE 102, WE 156.

As the plasticizers there were employed polyols having a boiling point of 150° C. such as, e.g., propyleneglycol or preferably glycerol.

c) Examples for the preparation of TPS blends based on starch/alkyd resin polyester (commercial product JÄGALYD WE 57)

From the following examples, the compositions of the TPS blends and the product properties resulting therefrom will be evident. Depending on the apparative equipment, the components may be individually added in metered amounts and may be employed as in the Examples in form of formulation-dependent admixtures for both the liquid and solid components). The compositions set forth hereinbelow represent the initial compositions in % by mass. Upon extrusion, the products are vented to a water content of <10% by weight.

Example 1

Starch in an amount of 4.51 kg/h and an admixture comprising water, glycerol and an alkyd resin dispersion (WE 57) in a ratio of 1.5:6:2.5 in amount of 1.49 kg/h are supplied to an extruder at a rate of screw rotation of 100 rpm and at a temperature of 120° C. (housing temperature). The extrudate has the composition:

| Starch | Alkyd resin | Glycerol | Water |
|---|---|---|---|
| 60.1 | 4.1 | 14.9 | 20.9 (without venting) |
| 69.8 | 4.7 | 17.3 | 8.2 (after venting) |

Example 2

Starch in an amount of 4.30 kg/h and an admixture comprising water, glycerol and an alkyd resin dispersion (WE 57) in a ratio of 1:5.3:3.8 in amount of 1.70 kg/h are supplied to an extruder at otherwise the same extrusion conditions. The resulting blend has the composition:

| Starch | Alkyd resin | Glycerol | Water |
|---|---|---|---|
| 57.3 | 6.9 | 14.9 | 20.9 (without venting) |
| 65.9 | 8.0 | 17.1 | 9.0 (after venting) |

Example 3

Under the specified conditions (cf. Example 1), starch in an amount of 4.08 kg/h and an admixture comprising water, glycerol and an alkyd resin dispersion (WE 57) in a ratio of 0.5:4.7:4.8 in amount of 1.92 kg/h are supplied to an extruder at otherwise the same extrusion conditions. The resulting extrudate has the composition:

| Starch | Alkyd resin | Glycerol | Water |
|---|---|---|---|
| 54.4 | 10.0 | 15.0 | 20.6 (without venting) |
| 62.3 | 11.5 | 17.2 | 9.0 (after venting) |

The product was stored directly after its preparation in the form of granules under nitrogen. After 14 days of storage under nitrogen, the product was again thermoplastically extrudable under the above-identified conditions of preparation. This means that no cross-linking had occurred.

d) Material properties

TPS blends according to Examples 1 through 3 were stored in air for 14 days and, then, exhibited the following material properties:

| Example | Tensile strength at break, N/mm$^2$ |
|---|---|
| 1 | 6.5 |
| 2 | 6.8 |
| 3 | 6.0 |

These extrudates were no longer re-plasticizable and exhibited great stability to water (only swelling, no decay).

We claim:

1. A thermoplastically deformable composition comprising a mixture of a thermomechanically digested starch and an oxidatively reactive cross-linking alkyd resin said mixture being the product of a process comprising; thermomechanically digesting starch at a temperature from above 100° C. to about 170° C. and at least the intrinsic pressure of the mixture in admixture with a first material selected from the group consisting of water, lower molecular weight plasticizer, and mixtures thereof, and a second material comprised of an oxidatively reactive cross-linking alkyd resin.

2. The composition as claimed in claim 1 wherein said oxidatively cross-linking alkyd resin is an air-drying alkyd resin.

3. The composition as claimed in claim 1 wherein said oxidatively cross-linking alkyd resin, at least in part, comprises substances based on regrowable raw materials.

4. The composition as claimed in claim 1 wherein said oxidatively cross-linking alkyd resin predominantly comprises substances based on regrowable raw materials.

5. A composition of matter as claimed in claim 1 wherein said oxidatively cross-linking alkyd resin is derived from a polymer dispersion containing the alkyd resin as the disperse polymer phase in an aqueous liquid phase, said polymer dispersion being said second material comprised of an oxidatively reactive cross-linking alkyd resin.

6. The composition as claimed in claim 1 wherein said oxidatively reactive cross-linking alkyd resin comprises a polyester having moieties of unsaturated monocarboxylic acids.

7. A composition of matter as claimed in claim 6 wherein said unsaturated monocarboxylic acids contain at least 12 carbon atoms.

8. A composition of matter as claimed in claim 6 wherein said unsaturated monocarboxylic acids contain from 12 to 20 carbon atoms.

9. The composition as claimed in claim 6 wherein said polyester has, in addition to said moieties of unsaturated monocarboxylic acids, moieties of saturated monocarboxylic acids.

10. The composition as claimed in claim 9 wherein the saturated monocarboxylic acids are straight-chain monocarboxylic acids.

11. The composition as claimed in claim 9 wherein the saturated monocarboxylic acids are straight-chain monocarboxylic acids which contain at least 12 carbon atoms.

12. The composition as claimed in claim 9 wherein the saturated monocarboxylic acids are straight-chain monocarboxylic acids which contain from 12 to 20 atoms.

13. A composition of matter as claimed in claim 9 wherein the unsaturated monocarboxylic acid moieties are present at from about 20 to 60% by mole of the sum by mole of the saturated and unsaturated monocarboxylic acid moieties.

14. A composition of matter as claimed in claim 9 wherein the unsaturated monocarboxylic acid moieties are present at from about 30 to 50% by mole of the sum by mole of the saturated and unsaturated monocarboxylic acid moieties.

15. The composition as claimed in claim 1 wherein said oxidatively cross-linking alkyd resin is self-emulsifying.

16. The composition as claimed in claim 1 wherein said oxidatively cross-linking alkyd resin is present in an amount of less than about 40% by weight of the mixture based on the solids of the mixture free from water and lower molecular weight plasticizers.

17. The composition as claimed in claim 1 wherein said oxidatively cross-linking alkyd resin is present in an amount of from about 1 to 35% by weight of the mixture based on the solids of the mixture free from water and lower molecular weight plasticizers.

18. The composition as claimed in claim 1 wherein said oxidatively cross-linking alkyd resin is present in an amount of from about 1 to 15% by weight of the mixture based on the solids of the mixture free from water and lower molecular weight plasticizers.

19. The composition as claimed in claim 1 wherein said first material is present in an amount of at least about 10% by weight of total composition.

20. The composition as claimed in claim 1 wherein said first material is present in an amount of at least about 15% by weight of total composition.

21. The composition as claimed in claim 1 wherein said first material is present in an amount of from about 25 to 55% by weight of the total composition.

22. The composition as claimed in claim 1 wherein said first material is selected from the group consisting of (i) a lower molecular weight plasticizer selected from the group consisting of a lower polyfunctional alcohols and ethers thereof and (ii) a mixture of water and lower molecular weight plasticizer selected from the group consisting of lower polyfunctional alcohols and ethers thereof.

23. The composition as claimed in claim 22 wherein said lower molecular weight plasticizer is selected from the group consisting of glycerol, ethers of glycerol and mixtures thereof.

24. The composition as claimed in claim 22 wherein said first material is present in an amount from 10 to 50% by weight based on the total mixture.

25. The composition as claimed in claim 22 wherein said first material is present in an amount from 15 to 35% by weight based on the total mixture.

26. Shaped articles produced by a process comprising:

shaping a composition as claimed in claim 1 and exposing said composition, after said shaping, to the presence of oxygen such that said alkyd resin of said composition undergoes an oxidative reaction.

27. Shaped articles as claimed in claim 26 wherein said oxygen is present as air.

28. A process for producing a thermoplastically deformable composition comprising: mixing in a mixing zone native starch with an aqueous dispersion of an oxidatively cross-linking alkyd resin at a temperature above 100° C. to about 170° C. under at least intrinsic pressure of the mixture, whereby a thermoplastically deformable starch is formed.

29. The process as claimed in claim 28 wherein said thermoplastically deformable starch is shaped immediately after leaving the mixing zone.

30. The process as claimed in claim 28 wherein said thermoplastically deformable starch is stored in the absence of air after leaving the mixing zone.

31. The process as claimed in claim 28 wherein said mixture is further comprised of a material selected from the group consisting of lower molecular weight plasticizers, water and mixtures of lower molecular weight plasticizers and water.

32. The process as claimed in claim 28 wherein said mixing is carried out in the absence of oxygen.

33. The process as claimed in claim 28 wherein said mixing is carried out in a closed kneader.

34. The process as claimed in claim 28 wherein said mixing is carried out in a closed extruder.

35. The process as claimed in claim 28, wherein residence time and processing conditions in said mixing zone are adjusted so that the starch is thermomechanically digested and a homogeneous mixture of all of the components is accomplished.

36. The process as claimed in claim 28 wherein said temperature is above 120° C. at least in final phases of the process of mixing and starch digestion.

37. The process as claimed in claim 28 wherein said temperature is within the range of from about 140° C. to about 170° C. at least in final phases of the process of mixing and starch digestion.

38. The process as claimed in claim 28 wherein residence time of the native starch and the aqueous dispersion of the oxidatively cross-linking alkyd resin in the mixing zone is up to 30 minutes.

39. The process as claimed in claim 38 wherein the residence time is in the range of from about 0.5 to 10 minutes.

40. The process as claimed in claim 28 wherein the mixing is continuous.

41. The process as claimed in claim 28 wherein said mixing zone is a heated extruder, to which said native starch and said aqueous dispersion of the alkyd resin are separately supplied in a feed zone and the resulting thermoplastically deformable starch is recovered as extrudate.

42. The process as claimed in claim 41 wherein said thermoplastically deformable starch is collected and stored under an inert gas.

43. A process as claimed in claim 41 wherein said native starch is a starch powder prior to said mixing.

44. The process as claimed in claim 41 further comprising partially stripping excess water from the thermoplastically deformable starch.

* * * * *

UNITED STATES PATENT AND TRADEMARK OFFICE
CERTIFICATE OF CORRECTION

PATENT NO. : 5,512,617
DATED : April 30, 1996
INVENTOR(S) : Ritter et al.

It is certified that error appears in the above-indentified patent and that said Letters Patent is hereby corrected as shown below:

In Col. 7, line 20, please insert the following, --U.S. 5,439,953, which is incorporated herein by reference, at column 1 discloses: Here, for producing a thermoplastically processable starch it is proposed to mix additives with the native or natural starch, which additives decrease the melting temperature of the starch and are additionally characterized by some definite solubility parameter. Furthermore the vapor pressure of the additive should be less than 1 bar in the melting range of the mixture of starch plus additive. As the additive there may be mentioned polyfunctional lower alcohols such as ethylene glycol, propylene glycol, glycerol, 1, 3-butane diol, diglyceride, corresponding ethers, but also compounds such as dimethylsulfoxide, dimethylformamide, dimethylurea, dimethylocetamide, and the corresponding monomethyl derivatives.

In addition, to or in place of part of the water employed in the mixture, lower organic plasticizers or plasticizing agents of the type initially mentioned may be used. These may include, in particular, lower polyfunctional alcohols such as ethylene glycol, propylene glycol, butane diol, glycerol and/or ethers thereof especially partial ethers.--.

UNITED STATES PATENT AND TRADEMARK OFFICE
CERTIFICATE OF CORRECTION

PATENT NO. : 5,512,617
DATED : April 30, 1996
INVENTOR(S) : Ritter et al.

It is certified that error appears in the above-indentified patent and that said Letters Patent is hereby corrected as shown below:

In Col. 11, claim 1, line 6, please delete [lower molecular weight plasticizer], and insert --ethylene glycol, propylene glycol, glycerol, butane diol, diglyceride, the corresponding full ethers, and the corresponding partial ethers of the preceding compounds, dimethyl sulfoxide, monomethyl sulfoxide, dimethyl formamide, monomethyl formamide, dimethyl urea, monomethyl urea, dimethylacetamide, monomethyl, acetamide--.

In Col. 11, claim 16, lines 60 and 61, please delete [water and lower molecular weight plasticizers], and insert --the first material.--.

In Col. 11, claim 17, lines 65 and 66, please delete [water and lower molecular weight plasticizers], and insert --the first material.--.

In Col. 12, claim 18, lines 3 and 4, please delete [water and lower molecular weight plasticizers] and insert --the first material.--.

In Col. 12, claim 22, lines 14-19, please delete [(i) a lower molecular weight plasticizer selected from the group consisting of a lower polyfunctional alcohols and ethers thereof and (ii) a mixture of water and lower molecular weight plasticizer selected from the group consisting of lower polyfunctional alcohols and ethers thereof] and insert --ethylene glycol, propylene glycol, glycerol, butane diol, diglyceride, ethers of the foregoing, water and mixtures thereof.--.

In Col. 12, claim 23, line 21, please delete [lower molecular weight plasticizer], and insert --first material--.

In Col. 12, claim 23, line 22, after "glycerol" please insert --water--.

UNITED STATES PATENT AND TRADEMARK OFFICE
CERTIFICATE OF CORRECTION

PATENT NO. : 5,512,617
DATED : April 30, 1996
INVENTOR(S) : Ritter et al.

It is certified that error appears in the above-indentified patent and that said Letters Patent is hereby corrected as shown below:

In Col. 12, claim 31, line 50, after "a" please insert --first--.
In Col. 12, claim 31, line 51, please delete [lower molecular weight plasticizers].
In Col. 12, claim 31, line 52, after "water" please insert --, ethylene glycol, propylene glycol, glycerol, butane diol, diglyceride, the corresponding full ethers, and the corresponding partial ethers of the preceding compounds, dimethyl sulfoxide, monomethyl sulfoxide, dimethyl formamide, monomethyl formamide, dimethyl urea, monomethyl urea, dimethylacetamide, monomethyl, acetamide--.
In Col. 12, claim 31, line 52, after "mixtures" please delete [of lower molecular weight plasticizers and water], and insert --thereof--.

Signed and Sealed this

First Day of December, 1998

*Attest:*

BRUCE LEHMAN

*Attesting Officer*     Commissioner of Patents and Trademarks